United States Patent [19]

Strobel

[11] Patent Number: 4,767,960
[45] Date of Patent: Aug. 30, 1988

[54] CYLINDER PRESSURE TRANSMITTER FOR AN INTERNAL COMBUSTION ENGINE

[75] Inventor: Stephen J. Strobel, Providence, R.I.

[73] Assignee: Texas Instruments Incorporated, Dallas, Tex.

[21] Appl. No.: 561,757

[22] Filed: Dec. 15, 1983

[51] Int. Cl.⁴ .............................................. H01L 41/08
[52] U.S. Cl. ..................................................... 310/338
[58] Field of Search ................ 310/338, 339, 329, 346; 73/715, 717, 723, 753, 754

[56] References Cited

U.S. PATENT DOCUMENTS

| | | | |
|---|---|---|---|
| 2,096,826 | 10/1937 | Schrader | 310/338 |
| 2,190,713 | 2/1940 | Hintze et al. | 310/338 X |
| 2,454,264 | 11/1948 | Stigter | 310/338 |
| 2,917,642 | 12/1959 | Wright et al. | 310/338 X |
| 3,269,175 | 8/1966 | Sprosty | 310/338 X |
| 3,461,327 | 8/1969 | Zeiringer | 310/338 |
| 3,566,163 | 2/1971 | Fischer et al. | 310/338 X |
| 3,783,309 | 1/1974 | Ailbert et al. | 310/338 |
| 3,857,287 | 12/1974 | Sonderegger et al. | 310/338 X |
| 4,021,688 | 5/1977 | Kudinov et al. | 310/338 |
| 4,286,687 | 9/1981 | Fiske, Jr. | 310/338 X |

Primary Examiner—Mark O. Budd
Attorney, Agent, or Firm—James P. McAndrews; John A. Haug; Melvin Sharp

[57] ABSTRACT

A cylinder pressure transmitter has piezoelectric means to provide an electrical signal corresponding to pressure in a cylinder of an automotive internal combustion engine during engine operation and has electronic means to amplify the signal for transmission to computer control means for use in regulating spark advance to improve engine efficiency and performance and reduce engine knocking. The pressure transmitter has a generally cylindrical body having a chamber open at both ends for attachment to an engine cylinder, has a diaphragm secured over one end of the chamber, and has the piezoelectric means held against the diaphragm with a selected preload compressive force by backing means which are threadedly engaged with the body inside the chamber for adjustment to provide the desired force.

2 Claims, 1 Drawing Sheet

CYLINDER PRESSURE TRANSMITTER FOR AN INTERNAL COMBUSTION ENGINE

BACKGROUND OF THE INVENTION

The is invention is that of pressure sensors and the invention relates more particularly to a cylinder pressure transmitter responsive to variations in pressure within a cylinder in an internal combustion engine during engine operation to provide an electrical control signal for use in regulating engine operation.

In a commonly assigned, copending patent application filed of even date herewith, Ser. No. 561,842 a cylinder pressure transmitter comprises means for mounting piezoelectric means in sealed relation to an engine cylinder to be responsive to variations in cylinder pressure during engine operation to provide initial electrical signals representative of pressure variations in the cylinder. That transmitter includes high temperature electronic means which are carried by the mounting means and which are electromagnetically shielded with the piezoelectric means within the mounting means for amplifying those initial signals to provide low impedance signals for transmission to computer control means or other signal processing means at a location remote from the cylinder. In that transmitter, the piezoelectric means preferably comprises a pair of piezoelectric discs which are polarized in opposite directions on opposite sides of a conductor electrode to generate the charge output from the discs in response to applied pressure and the discs are mounted against a flexible diaphragm with a selected preload compressive force to be responsive to pressure forces applied through the diaphragm.

However, it is found that such piezoelectric cylinder pressure transmitters are difficult to mass produce for use in commercial automotive applications.

BRIEF SUMMARY OF THE INVENTION

It is an object of this invention to provide a novel and improved cylinder pressure transmitter; to provide such a pressure transmitter which is adapted to be economically and repetitively manufactured at suitably low cost for reliable use over a long service life; and to provide such a pressure transmitter which furnishes strong, low impedance output signals properly representative of variations in cylinder pressure during engine operation for transmission to computer control means at a location remote from the cylinder.

Briefly described, the novel and improved cylinder pressure sensing means of this invention comprises a cylinder pressure transmitter incorporating piezoelectric means which provide an electrical signal in response to application of pressure thereto. Preferably the piezoelectric means comprises a pair of selected, high temperature ceramic piezoelectric discs of doped lead zirconium titanate or lead metaniobate or the like which are disposed on opposite sides of a common electrode with the discs polarized in opposite directions. Preferably the discs are also laterally sheathed in a tube or sleeve of temperature resistant, electrically isolating material such as tetrafluoroethylene polymer (Teflon) or the like having a low elastic constant.

The transmitter also includes means for mounting the piezoelectric means so that the piezoelectric means is easily and reliably disposed in sealed relation to a cylinder of an internal combustion engine to be responsive to variations in cylinder pressure during engine operation. Preferably the mounting means comprises a generally cylindrical, sparkplug-like body having a central chamber which is open at opposite ends of the body. A metal diaphragm of selected flexibility is welded or otherwise secured over the opening at one end of the chamber and one side or end of the piezoelectric means is disposed against one side of the diaphragm. Alternately a ceramic thermal barrier element is arranged between the diaphragm and piezoelectric means to bear against the piezoelectric means for thermally protecting the piezoelectric means. A backing or support means is threadedly mounted on the body inside the chamber and is adjusted to bear against an opposite end of the piezoelectric means for providing a selected preload force thereon. The body preferably has external screw means for mounting the body in an opening in a wall of an engine cylinder in sealed relation thereto for exposing an opposite side of the diaphragm to pressures within the cylinder.

The transmitter further includes high temperature electronic means which are carried by the mounting means and are electromagnetically shielded with the piezoelectric means within the mounting means for amplifying the electrical signal provided by the piezoelectric means, thereby to provide a low impedance signal suitable for transmission to computer control means or the like at a location remote from the engine cylinder.

In that way the novel and improved cylinder pressure transmitter of this invention is adapted for convenient and repetitive manufacture for reliable use over a long service life. The piezoelectric means provided in the pressure transmitter furnish an initial signal of relatively low impedance and that signal is shielded and properly amplified for providing a signal representative of variations in cylinder pressure during the full engine cycle suitable for transmission to computer control means or the like at a location remote from the engine cylinder. The pressure transmitter is also of simple, rugged and low cost construction and is adapted for widespread use in commercial automotive applications.

DESCRIPTION OF THE DRAWINGS

Other objects, advantages and details of the novel and improved cylinder pressure transmitter of this invention appear in the following detailed description of preferred embodiments of the invention, the detailed description referring to the drawings in which.

DESCRIPTION OF THE PREFERRED EMBODIMENT

Figure 1:
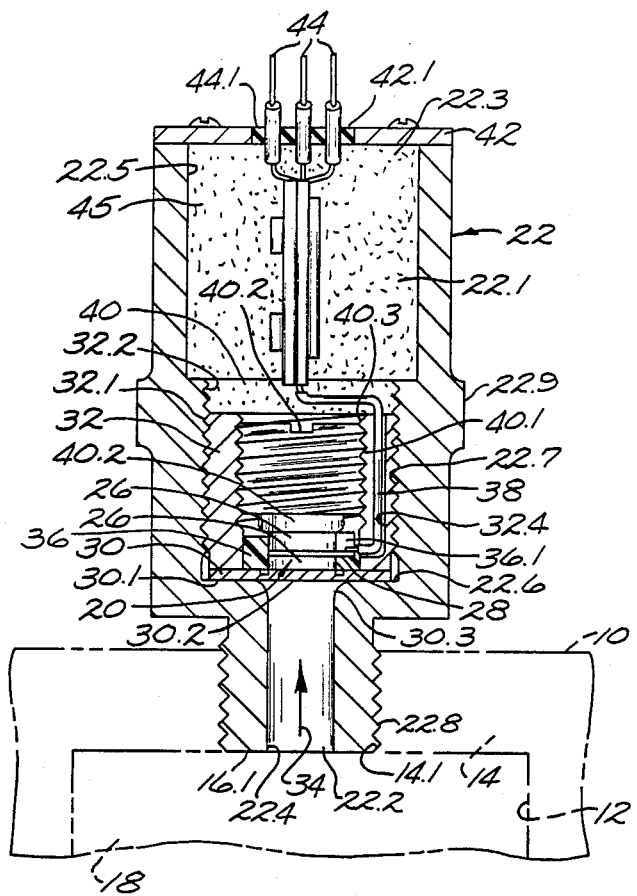
FIG. 1 is a section view along the lOngitudinal axis 0f the cylinder pressure transmitter of this invention diagrammatically illustrating mounting of the transmitter in sealed relation to a cylinder in an internal combustion engine.

Referring to the drawings, 10 in FIG. 1 diagramatically indicates a conventional internal combustion engine having a cylinder 12 with a wall 14. A cylinder pressure transmitter 16 in accordance with this invention, preferably having a size and outer configuration generally corresponding to that of a sparkplug, is mounted in a well 14.1 in the cylinder wall in sealed relation to the cylinder so that an end 16.1 of the transmitter is exposed to pressure conditions within the combustion chamber 18 of the cylinder.

The pressure transmitter 16 comprises piezoelectric means 20 which are adapted to provide an electrical signal in response to application of pressure or compressive force thereto. The piezoelectric means are mounted on a body 22 which serves to mount the piezoelectric means in sealed relation to a cylinder of an internal combustion engine to be responsive to variations in cylinder pressure during engine operation for providing an inital electrical signal representative of the cylinder pressure. Electronic means 24 are also preferably carried by the body 22 and are provided common electromagnetic shielding with the piezoelectric means by the body for amplifying the initial signal provided by the piezoelectric means so that the signal is adapted to be reliably transmitted to a control computer means or the like at a location remote from the piezoelectric means.

The piezoelectric means 20 preferably comprises a pair of discs 26 of a ceramic piezoelectric material such as doped lead zirconium titanate or lead metaniobate or the like which has a relatively high Curie temperature above about 175° C. and a relatively low coefficient of thermal expansion. The piezoelectric discs each have a metal contact layer (not shown) on opposite side surfaces of the discs in conventional manner. Preferably the contact layers are of gold or the like to be stable at the noted high temperature. The discs are disposed on respective opposite sides of a conductor electrode 28 of a high conductivity material such as copper or the like so that a contact surface of each disc is abutted in electrically connected relation to the electrode conductor. The discs are polarized in opposite directions on opposite sides of the conductor electrode as is described above with respect to the copending application to generate the charge output from the discs occuring in response to pressures applied to the discs along the pole axis while cancelling noise signal effects such as might be due to vibration forces and the like applied to the discs from other directions.

In one preferred embodiment, the discs 26 comprise a chromium doped lead zirconium titanate material having an empirical formula of $Pb1.01(Zr._{53}Ti_{.47})O_3Cr_{.03}$, having a Curie temperature of about 370° C., having a relatively low coefficient of thermal expansion, and having a pressure response characteristic on the order of about $35 \times 10^{-3}$ V/N (volts per newton). In another preferred embodiment, an additional calcium dopant is incorporated in that noted material for improving pressure sensitivity. In another preferred embodiment, the discs 26 comprise a lead metaniobate material having a composition of $PbNb_2O_6$, having a Curie temperature of about 570° C., having a low thermal expansion coefficient, and having a pressure response characteristic of about $42 \times 10^{-3}$ V/N.

The body 22 comprises a generally cylindical member having a chamber 22.1 which has openings 22.2, 22.3 at opposite ends of the chamber. The body mounts a strong and stiffly flexible metal diaphragm 30 over one opening to protect the piezoelectric means 20 from the environment within the cylinder. The body is formed of cold rolled steel to provide electromagnetic shielding for the piezoelectric means in the automotive environment where r.f. interference from adjacent high potential sparkplug firing and the like is likely to occur.

In a preferred embodiment for example, the body 22 has a first bore 22.4 at one end and has a second, larger bore 22.5 at an opposite end forming a shoulder 22.6 between the bores. At least part of the second bore is internally threaded as indicated at 22.7. Preferably the metal body is also externally threaded at one end as indicated at 22.8 and has an exterior portion 22.9 of hexagonal outer configuration for use in facilitating threaded mounting of the body in the well 14.1 on the engine cylinder.

The metal diaphragm 30 is disposed within the chamber 22.1 over the chamber opening 22.2 so that the perimeter 30.1 of the diaphragm rests on ths body shoulder 22.6. A diaphragm mounting sleeve 32 having external threads 32.1 and internal threads 32.2 is threadedly engaged with the metal body within the chamber 22.1 and is adjusted therein to bear against the perimeter of the diaphragm for securely holding the diaphragm in position on the body even though a very high force should be applied to the diaphragm from within the combustion chamber 18 during engine operation as indicated in FIG. 1 by the arrow 34. Preferably the mounting sleeve has a slot 32.3 for use in rotating the sleeve to adjust its position in the chamber 22.1.

The piezoelectric discs 26 and the electrode conductor 28 are disposed within a sleeve 36 of a temperature resistant, electrically isolating, organic material such as Teflon or the like which has a low elastic constant. A wire lead 38 preferably having an insulating Teflon coating is connected to the conductor 28 and extends from the conductor via a groove 36.1 formed in the inside of the Teflon sleeve and through a groove 32.4 formed in the diaphragm mounting sleeve to the electronic means 24 as shown in FIG. 1.

An adjustable support means such as a threaded stud 40 having external screw threads 40,1 is disposed within the chamber 22.1 in threaded engagement with the internal threads 32.2 on the diaphragm mounting sleeve. The stud is rotatably adjusted by use of the slot 40.2 so an end 40.3 of the support stud bears against the other piezoelectric disc 26 and electrically engages a metal contact layer (not shown) on that other disc. The support stud is advanced to a desired position in the sleeve 32 to apply a selected degree of preload compressive force to the piezoelectric discs 26 on the diaphragm. The stud is then secured at that desired position by punching, welding or cementing or the like as indicated at 40.3.

Preferably for example that preload force corresponds to at least the compressive force which would be applied to the piezoelectric means 20 by application of a fluid pressure of one atmosphere to the diaphragm 30.

Preferably the diaphragm 30 has a central part 30.2 of selected thickness to bear uniformly against a piezoelectric disc 26 across the full surface of the disc but has another portion 30.3 of relatively lesser thickness around the central part providing a preferential flexing location for the diaphragm in response to cylinder pressures 34. The electronic means 24 are preferably located within the body 22 as shown in FIG. 1 so that they are electromagnetically shielded in common with the piezoelectric means 20 by the metal body. Preferably as is shown in FIG. 1 the electronic means 24 are mounted within the chamber 22.1 above the support stud 40 and a chamber cover 42 is secured over the chamber opening 22.3 in any conventional manner. The cover preferably has a central opening 42.1 and one or more conductive means 44 such as Teflon coated leads electrically connected to the electronic means 24 are separately mounted in the opening by use of electrically insulating glass or phenolic means 44.1 or the like to serve as terminals for the cylinder pressure transmitter 16. Preferably the chamber 22.1 is filled with a potting compound such as a silicone material filled with alumina powder or the like as indicated by stippling 45 to support and electrically isolate the electronic means 24 and to facilitate heat dissipation from the device 16. If desired, separate portions of the body 22 mount the piezoelectric means and the electronic means respectively and those body portions can be adapted to be separated when desired by means not shown for permiting separate replacement of the piezoelectric or electronic means.

In that arrangement, piezoelectric discs 26 are laterally shielded from vibration by the sleeve 36 which also serves to electrically isolate the edges of the discs from the metal body. Opposite ends of the discs which are of common polarity are electrically connected to ground via the support stud, the diaphragm, the diaphragm mounting sleeve and body 22 while contact layers on the opposite side of each disc are connected to the electronic means 24 via the common electrode conductor 28 and the lead 38. The body, diaphragm, sleeve, stud and discs are conveniently assembled as described so that that the movement of the diaphragm in response to pressure forces applied to the diaphragm provides analog output from the piezoelectric means proportional to the applied pressure. The preload force applied to the discs permits the piezoelectric means to provide an output signal which is proportional to subatmosheric pressures which are typically encountered in the cylinder 12 during engine operation.

The electronic means 24 preferably incorporate active and passive components which are each adapted to be operable over a suitably long service life at the relatively high temperatures of about 175° C. or above which are likely to be encountered where the electronic means are carried on the body 22 and are electromagnetically shielded with the piezoelectric pressure sensing means 20 by being enclosed within the body as shown in FIG. 1. In a preferred embodiment, the electronic means 24 comprise hybrid circuit means as have been described in the commonly assigned copending application noted above, the disclosure of which is incorporated in this application by this reference.

Figure 2:
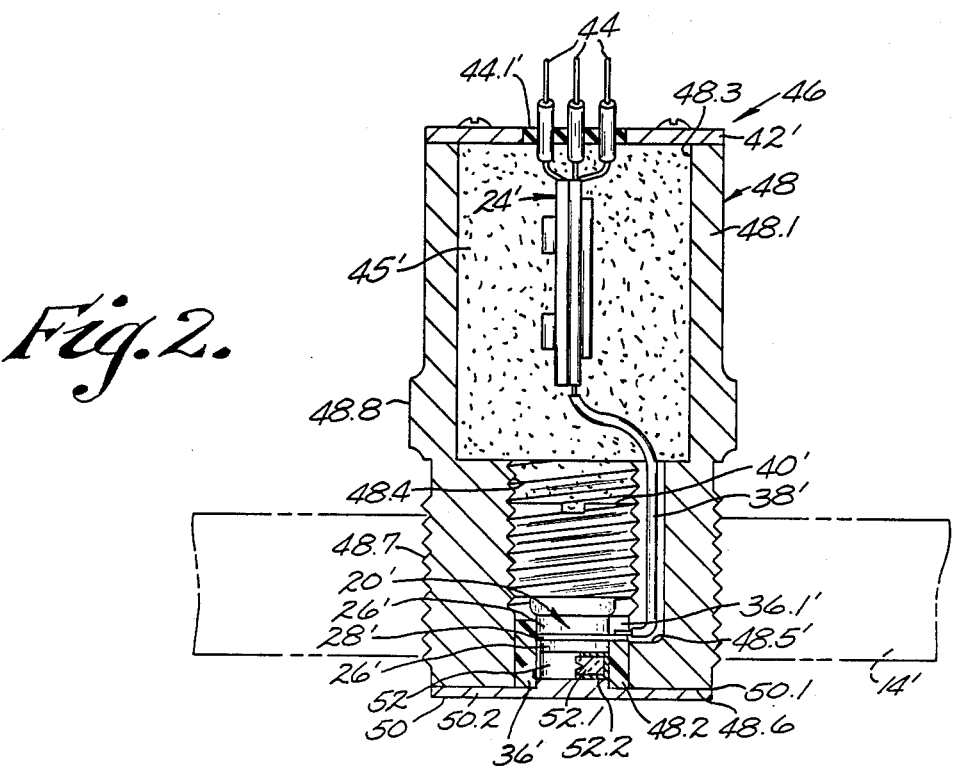
FIG. 2 is a section view similar to FIG. 1 illustrating another preferred embdiment of the transmitter of this invention.

In another preferred embodiment of the invention as illustrated at 46 in FIG. 2, wherein like components are identified with corresponding reference numerals, body 48 comprises a generally cylindrical member having a chamber 48.1 which has openings 48.2, 48.3 at opposite ends and at least part of the body chamber is internally threaded as indicated at 48.4. A slot 48.5 is preferably provided in the inner wall of the body in the internal threads 48.4. A metal diaphragm 50 is welded to the body over one of the chamber openings 48.2 as indicated at 50.1 in FIG. 2 so that the perimeter 50.2 of the diaphragm is well supported by the end 48.6 of the metal body. The body has external threads 48.7 thereon at one end and has a portion 43.8 of hexagonal outer configuration for use in mounting the transmitter on the cylinder wall 14'. A pair of ceramic piezoelectric disc elements 26' are arranged on opposite sides of a common electrode conductor 28' for forming a piezoelectric means 20' corresponding to the piezoelectric means 20 previously described with reference to FIG. 1. A Teflon coated lead 38' is connected to the common conductor and extends through the slot 48.5 to electrically connect the common conductor 38' to the electronic means 24'. A vibration-damping and electrically isolating Teflon sleeve 36' is fitted over the piezoelectric means. A support or backing stud 40' is threadedly engaged with the body 48 inside the body chamber and is adjusted to bear against the piezoelectric means 20' to provide the desired preload compressive force thereon. The electronic means 24' are connected to terminal means 44' sealed in a cover 42' by sealing means 44.1' and a potting compound 45' fills the chamber 48.1 around the electronic means.

Preferably a thermal barrier element 52 comprises a ceramic disc 52.1 of alumina or the like coated on all sides with a conductive metal 52.2 such as gold or the like. The thermal barrier is interposed between the piezoelectric means 20' and the diaphragm 50 for electrically connecting the piezoelectric means to ground-through the diaphragm, for transmitting movement of the diaphragm 50 to the piezoelectic means in response to pressure applied to the diaphragm, and for thermally protecting the piezoelectric means, particularly from temporary thermal extremes which may occur in the combustion chamber of the internal combustion engine. In that arrangement, the cylinder pressure transmitter 46 is characterized by improved compactness, strength and economy of manufacture while being adapted to provide improved performance during use.

It can be seen that the cylinder pressure transmitters of this invention have structures which are adpated to be repetitively manufactured for convenient and reliable use over a longer service life. The piezoelectric means incorporated in the pressure transmitter are adapted to provide initial signals of relatively low impedance and those signals are properly shielded from electromagnetic interference and are amplified to provide signals which are reliably representive of variations in cylinder pressure during engine operation and which are further adapted to be transmitted to computer control means or the like at a location remote from the engine cylinder. The pressure transmitters are also of simple, rugged and low cost construction.

It should be understood that although particular embodiments of this invention have been described above by way of illustrating the invention, this invention includes all modifications and equivalents of the disclosed embodiments falling within the scope of the appended claims.

I claim:

1. A cylinder pressure transmitter comprising a metal body having a chamber open at opposite ends, the metal body being adapted to be mounted on a cylinder of an internal combustion engine with one of the chamber openings disposed in sealed relation to the cylinder,
   a stiffly flexible metal diaphragm secured to the body over said one chamber opening so that one side of the diaphragm is adapted to be exposed to a pressure force from pressure within the engine cylinder to be movable in response to variations in pressure in the cylinder,
   piezeoelectric means mounted in the chamber against the diaphragm electrically connected at one end of the diaphragm,
   support means adjustably mounted within the chamber electrically engaging an opposite end of the piezoelectric means holding the piezoelectric means against the diaphragm to be responsive to movement of the diaphragm for providing an initial electrical signal representative of pressure in the cylinder during engine operation, electronic means operable at temperatures likely to be enountered adjacent an engine cylinder mounted in the body chamber and electromagnetically shielded in the chamber with the piezoelectric means to amplify said initial electrical signal for transmission to a location remote from the piezeoelectric means, said suppport means being threadedly mounted within the body chamber to be rotated therein for advancing the support means into selected pressing engagement with the piezoelectric means, said piezoelectric means comprising a conductor disc and a pair of ceramic piezoelectric disc elements which are arranged with oppositely disposed polarization directions on a common pole axis on respective opposite sides of the conductor disc so that one side of each element is electrically engaged with the common conductor, lead means being electrically connected to the conductor disc and the support means having a slot therein permitting the lead means to extend through the slot for electrically connecting the conductor disc to the electronic means, the metal body having a shoulder disposed around said one chamber opening, the diaphragm having a perimeter portion thereof disposed against the shoulder, a sleeve with internal and external threads having the external threads thereof threadedly engaged with a metal body inside the body chamber holding the perimeter portion of the diaphragm against said shoulder for securing the diaphragm over said one chamber opening, and the support means being threadedly engaged with the internal threads of said sleeve for pressing the piezoelectric means against the diaphragm with a selected preload compressive force.

2. A cylinder pressure transmitter according to claim 1 wherein the metal body has an integral tubular portion extending from the body around said one chamber opening, the tubular portion having screw threads thereon for mounting the metal body on a cylinder of an internal combustion engine in sealed relation to the cylinder.

* * * * *